United States Patent
Magielse

(10) Patent No.: US 11,206,724 B2
(45) Date of Patent: Dec. 21, 2021

(54) CONTROLLING A LIGHTING SYSTEM

(71) Applicant: SIGNIFY HOLDING B.V., Eindhoven (NL)

(72) Inventor: Remco Magielse, Tilburg (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/639,640

(22) PCT Filed: Aug. 10, 2018

(86) PCT No.: PCT/EP2018/071714
§ 371 (c)(1),
(2) Date: Feb. 17, 2020

(87) PCT Pub. No.: WO2019/034542
PCT Pub. Date: Feb. 21, 2019

(65) Prior Publication Data
US 2020/0367339 A1 Nov. 19, 2020

(30) Foreign Application Priority Data
Aug. 17, 2017 (EP) .................................... 17186537

(51) Int. Cl.
*H05B 47/105* (2020.01)
*H05B 47/19* (2020.01)
(Continued)

(52) U.S. Cl.
CPC .......... *H05B 47/105* (2020.01); *H05B 47/19* (2020.01); *H05B 47/115* (2020.01); *H05B 47/13* (2020.01)

(58) Field of Classification Search
CPC .............................. H05B 47/105; H05B 47/19
See application file for complete search history.

(56) References Cited

U.S. PATENT DOCUMENTS

| 8,638,191 B2 | 1/2014 | Hamel et al. |
| 9,198,262 B1 | 11/2015 | Bosua et al. |

(Continued)

FOREIGN PATENT DOCUMENTS

| CN | 105451414 A | 3/2016 |
| EP | 2603061 A1 | 6/2013 |

(Continued)

*Primary Examiner* — Raymond R Chai

(57) ABSTRACT

A method of controlling a lighting system comprising a plurality of illumination sources each controllable to emit illumination for illuminating the environment and a plurality of control apparatus for use in controlling the illumination emitted from one or more of the plurality of illumination sources, the method comprising: determining the relative position of a first control apparatus compared to a second control apparatus; assigning a function to the first control apparatus, the function defining how the first control apparatus is to control the illumination of one or more illumination sources, wherein the function of the first control apparatus is assigned based on the determined relative position; whereby a first user input can be received at the first control apparatus and the illumination of the one or more illumination sources can be controlled in response to the first user input based on the assigned function of the first control apparatus.

11 Claims, 2 Drawing Sheets

(51) Int. Cl.
*H05B 47/115* (2020.01)
*H05B 47/13* (2020.01)

(56) References Cited

U.S. PATENT DOCUMENTS

| | | | |
|---|---|---|---|
| 9,731,645 B1 | | 8/2017 | Taleb-Bendiab |
| 2005/0094610 A1* | | 5/2005 | de Clerq ............... H04W 4/021 |
| | | | 370/338 |
| 2009/0002981 A1* | | 1/2009 | Knibbe .................... G01S 5/14 |
| | | | 362/233 |
| 2016/0113097 A1* | | 4/2016 | King ...................... H05B 47/16 |
| | | | 315/136 |
| 2016/0142093 A1 | | 5/2016 | Phang |
| 2016/0150624 A1 | | 5/2016 | Meerbeek et al. |
| 2021/0176846 A1* | | 6/2021 | Abraham ............... H05B 47/19 |

FOREIGN PATENT DOCUMENTS

| | | |
|---|---|---|
| KR | 100461504 B1 | 12/2004 |
| WO | 2006095317 A1 | 9/2006 |
| WO | 2007031891 A1 | 3/2007 |
| WO | 2010004461 A2 | 1/2010 |
| WO | 2010064167 A2 | 6/2010 |
| WO | 2015104603 A2 | 7/2015 |
| WO | 2015113833 A1 | 8/2015 |
| WO | 2015114123 A1 | 8/2015 |
| WO | 2015185402 A1 | 12/2015 |
| WO | 2017003931 A1 | 1/2017 |
| WO | 2017029368 A1 | 2/2017 |
| WO | 2017093373 A1 | 6/2017 |

\* cited by examiner

CONTROLLING A LIGHTING SYSTEM

CROSS-REFERENCE TO PRIOR APPLICATIONS

This application is the U.S. National Phase application under 35 U.S.C. § 371 of International Application No. PCT/EP2018/071714, filed on Aug. 10, 2018, which claims the benefit of European Patent Application No. 17186537.1, filed on Aug. 17, 2017. These applications are hereby incorporated by reference herein.

TECHNICAL FIELD

The present disclosure relates to a method and control equipment for controlling a lighting system.

BACKGROUND

Connected lighting refers to a system of one or more luminaires (or illumination sources) which are controlled not by (or not only by) a traditional wired, electrical on-off or dimmer circuit, but rather by using a data communications protocol via a wired or more often wireless connection, e.g. a wired or wireless network. Typically, the luminaires, or even individual lamps within a luminaire, may each be equipped with a wireless receiver or transceiver for receiving lighting control commands from a lighting control device according to a wireless networking protocol such as ZigBee, Wi-Fi or Bluetooth (and optionally also for sending status reports to the lighting control device using the wireless networking protocol). The lighting control device may take the form of a user terminal, e.g. a portable user terminal such as a smartphone, tablet, laptop or smart watch; or a static user terminal such as a desktop computer or wireless wall-panel. In such cases the lighting control commands may originate from an application running on the user terminal, either based on user inputs provided to the application by the user through a user interface of the user terminal (e.g. a touch screen or point-and-click interface), and/or based on an automatized function of the application. The user equipment may send the lighting control commands to the luminaires directly, or via an intermediate device such as a wireless router, access point or lighting bridge.

In current connected lighting systems, selection and control of the light sources usually occurs by fixed devices, such as wall switches and wall-mounted control panels. Controls such as switches mounted on the wall are used to control the light sources such as to turn lights on or off, or dim the lights. Current connected lighting systems also include portable remote control devices for adjusting light sources, such as a smartphone or tablet installed with a suitable lighting control app. In this way, users can modify light sources without having to use a fixed wall-mounted device.

SUMMARY

According to a first aspect disclosed herein, there is provided a method of controlling a lighting system comprising a plurality of illumination sources each controllable to emit respective illumination for illuminating the environment and a plurality of control apparatus for use in controlling the illumination emitted from one or more of said plurality of illumination sources, the method comprising: determining the relative position of a first control apparatus compared to a second control apparatus; assigning a function to the first control apparatus, the function defining how the first control apparatus is to control the illumination of one or more of said illumination sources, wherein the function of the first control apparatus is assigned based on the determined relative position, whereby a first user input can be received at the first control apparatus and the illumination of said one or more illumination sources can be controlled in response to the first user input based on the assigned function of the first control apparatus.

That is, the function of the first control apparatus is dependent on the relative position of itself compared to a second control apparatus. This is particularly advantageous for the user as the behaviour of the first control apparatus may be changed (according to the user's needs) by varying the position of the first control apparatus in relation to the second control apparatus.

In an example, the first control apparatus comprises an actuator device such as a button, switch, dial or slider device comprising one or more buttons, switches, dials and/or sliders etc. In embodiments, the second control apparatus may also comprise such a device, or alternatively may comprise another related piece of equipment such a mounting station such as a mounting plate for supporting the first control device.

In an example, the assigned function could for example include an on/off function, a dimming function (dimming by degrees between on and off), a colour control function, a function which cycles through predefined lighting scenes, and/or a function for setting a dynamic lighting effect.

In an example, said determining of the relative position comprises determining whether or not the first control apparatus and the second control apparatus are co-located according to at least one predetermined criterion, wherein said assigning of the function of the first control apparatus is based on whether the first control apparatus and the second control apparatus are determined to be co-located according to said at least one criterion, the first control apparatus being assigned a first function if the first control apparatus and the second control apparatus are co-located and the first control apparatus being assigned a second, different function if the first control apparatus and the second control apparatus are not co-located.

That is, the first control apparatus has a first function (or behaviour) when two or more control apparatus satisfy a predetermined criterion (e.g. two control apparatus co-located within the same vicinity or one control apparatus mounted on a second control apparatus) but has a second function when it used in a stand-alone mode (i.e. not co-located).

In an example, the function of the second control apparatus may be assigned based on the determined relative position of the first control apparatus compared to the second control apparatus. In another example, the assigned function of the second control apparatus may also be based on whether or not the first control apparatus and second control apparatus are co-located according to at least on predetermined criterion.

In an example, the first control apparatus comprises a first control actuator for receiving said first user input and the second control apparatus comprises a second control actuator for receiving a second user input for controlling the lighting system.

For instance each of the first and second control apparatus may comprise a wireless button or switch device, e.g. a so-called "smart button" or "smart switch".

In an example, at least one predetermined criterion comprises: whether the first control apparatus is placed on top of the second control apparatus, wherein said function of the first control apparatus is based on whether the first control apparatus is placed on top of the second control apparatus.

In an example, said at least one predetermined criterion comprises: whether the first control apparatus is positioned on a same plane as the second control apparatus, wherein said function of the first control apparatus is based on whether the first control apparatus is positioned on the same plane as the second control apparatus.

In an example, said at least one predetermined criterion comprises: whether the first control apparatus and the second control apparatus are both mounted at a same mounting station suitable for mounting the first and second control apparatus, wherein said function of the first control apparatus is based on whether the first control apparatus and the second control apparatus are both mounted at the same mounting station.

In an example, said at least one predetermined criterion comprises: whether the first control apparatus and the second control apparatus are within a predetermined proximity of each other, wherein said function of the first control apparatus is based on whether the first control apparatus and the second control apparatus are within said predetermined proximity of each other.

That is, the function or behaviour of the first control apparatus may vary according to one or more predetermined criteria. For example, the function may be based on whether the first control apparatus is connected to a second control apparatus, placed side by side with or on the same surface as a second control apparatus. In another example, the function may be based on whether the first control apparatus and the second control apparatus are both mounted on a dedicated wall plate.

In another example, the predetermined proximity may be a radius between a point on the first control apparatus and a point on the second control apparatus or a radius from the circumference of a circular button.

In an example, the first control apparatus comprises a first control actuator for receiving the first user input and the second control apparatus comprises a mounting station suitable for mounting one or more of said plurality of control apparatus, and the wherein said at least one predetermined criterion comprises: whether the first control apparatus is mounted at the second control apparatus, wherein said function of the first control apparatus is based on whether the first control apparatus is mounted at second control apparatus.

That is, the function of the first control apparatus may vary when it is used in a stand-alone mode (e.g. held by the user) versus when it is mounted on a wall plate.

In an example, the second function comprises toggling said one or more illumination source(s) between an on and off state, and the first function comprises only an ability to set said one or more illumination sources to an on state or only an ability to set said one or more illumination sources to an off state.

In an example, the second function comprises toggling said one or more illumination sources between an on and off state.

In an example, the first function comprises at least one of: cycling though a list of predefined lighting settings; varying the colour of the illumination emitted by said one or more illumination sources; varying the colour temperature of the illumination emitted by said one or more illumination sources; varying a dim level of the illumination emitted by said one or more illumination sources by intermediate degrees between on and off.

In an example, the assigned function of the first control apparatus is programmable by a user.

For example, the first control apparatus may be a smart button which may be programmed by the user to perform certain actions within the lighting system. For example, it may be programmed to switch a (group of) illumination source(s) on or off, or activate a specific lighting scene.

In an example, determining the relative position of the first control apparatus compared to the second control apparatus comprises one of: detecting, by the first and/or second control apparatus, a received signal strength or time of flight of a wireless signal emitted from the second and/or first control apparatus respectively; detecting, by the first and/or second control apparatus, a magnetic field emitted from the second and/or first control apparatus respectively; detecting, by the first and/or second control apparatus, a near field communication element of the second and/or first control apparatus respectively; detecting, by the first and/or second control apparatus, a mechanical connection with the second and/or first control apparatus respectively; or detecting, by the first and/or second control apparatus, a physical contact with the second and/or first control apparatus respectively.

In an example, determining of the relative position comprises determining a relative orientation of the first and second control apparatus when both mounted at a mounting station suitable for mounting one or more of said plurality of control apparatus, wherein said function of the first control apparatus is also assigned based on the determined relative orientation of the first and second control apparatus when mounted at the mounting station.

For example, the relative orientation may comprise the first control apparatus being positioned above/below the second control apparatus in the same plane when both are mounted on a wall plate. In another example, the first control apparatus may be positioned to the left/right of the second control apparatus when mounted. In another example, the relative orientation may refer to the first and second control apparatus being located at different compass headings when mounted.

According to a second aspect disclosed herein, there is provided control equipment comprising control logic configured to perform operations in accordance with any of the method steps disclosed herein.

In an example, the control logic may be implemented in the first control apparatus, the second control apparatus, a central control unit such as a bridge, or on one or more remote servers, or distributed across any combination of these.

According to a third aspect disclosed herein, there is provided a computer program product comprising code embodied on computer-readable storage and configured so as when run on one or more processing units of a control system to perform operations in accordance with any of the method steps disclosed herein.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

Figure 1:
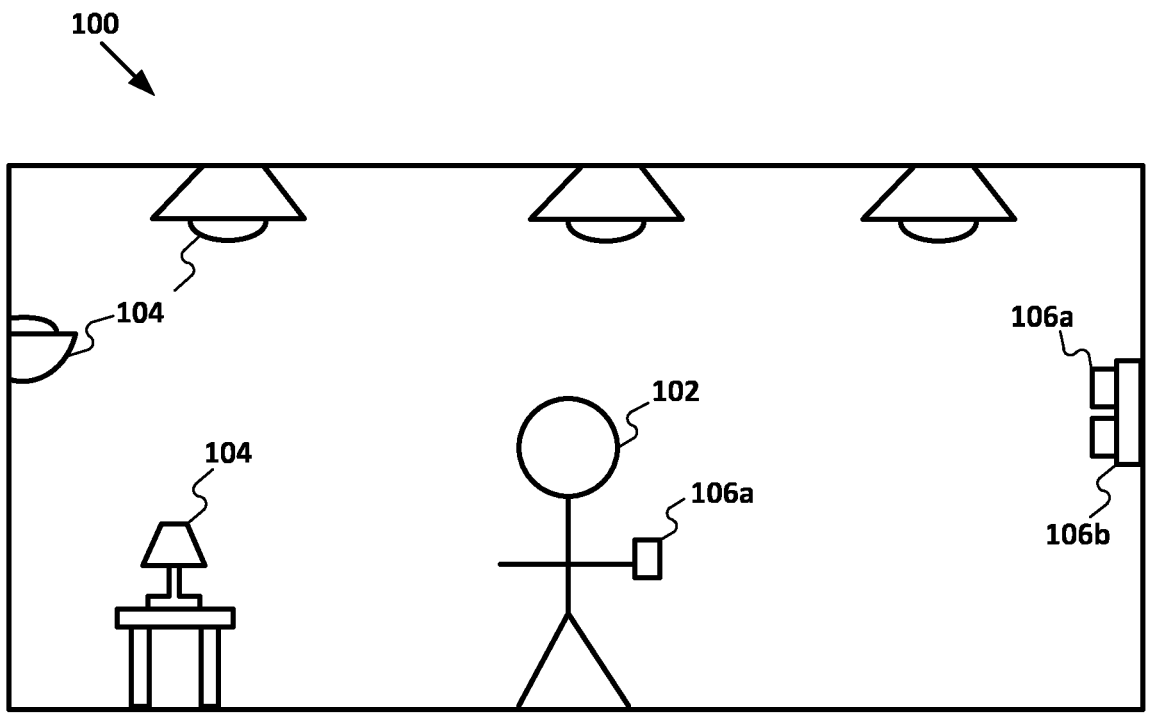
FIG. 1 shows schematically an environment comprising a lighting system.

As mentioned above, a portable remote control, such as a smart switch or smart button, may be used to control one or more aspects/settings of a lighting system. A smart button may be programmed by the user to perform a specific behaviour.

For example, the user may have programmed the smart button to switch on and set the lights in the living room to a relaxing scene in response to an input (e.g. pressing the button). The user may place the button a table next to the sofa where he/she most often recalls this particular lighting scene. Moreover, the behaviour of the button may change if it is placed above or next to another smart button. The resulting pair of buttons may be used to change a lighting parameter of the lights in the living room (or another room, or a particular subset of lights within a room). For example, the pair of buttons may change the brightness, whereby the upper button increases the brightness and the lower button decreases the brightness.

In examples, the user may assign the smart button a first function or behaviour when it is used in stand-alone mode (e.g. when the smart button is held by the user or placed on a table by itself). The user may assign the button a second, different function or behaviour when it is co-located with another device or button. This may occur for example when it is placed on top or next to another button or when it is mounted on a wall plate on its own or with another button. When a smart button is co-located with a second smart button or at a wall plate, the first function is temporarily replaced by the second function.

In another example, the user may assign the smart button a first function or behaviour that is dependent on the configuration in which the user places the button. For example, two buttons may be mounted on a wall plate or a charging pad or the like. The function of the first and/or second button may depend on their relative configuration or orientation. For example, if the buttons are placed in a vertical, stacked configuration, the top and bottom buttons may be used to increase/decrease the brightness respectively. In another example, if the buttons are placed side by side in a horizontal configuration, the left and right buttons may be used to cycle back and forth through predefined lighting scenes.

The function of each smart button may vary dependent on how many smart buttons are co-located. For example, when two smart buttons are co-located, the following behaviours may be set. A lighting parameter may be increased/decreased (e.g. brightness, hue, saturation, colour temperature). A list of predefined items may be cycled through back and forth (e.g. lighting scenes or lighting recipes). A total impact of an effect may be enhanced or reduced (e.g. lightness, speed).

Additionally, when three smart button are co-located, the following behaviours may be set. Various pre-sets may be recalled (e.g. lighting scenes). Various lighting parameters may be changed (e.g. brightness, hue and saturation, or red, blue and green parameters). In another example, the first button may toggle between an on/off state whilst the second and third button increase and decrease the brightness (or another parameter) respectively.

It will be appreciated that in addition to the specific examples given above, four or more smart buttons may be used to control various aspects of the lighting system in a similar manner.

FIG. 1 illustrates an example environment 100 in which embodiments disclosed herein may be employed. The environment 100 is a space which may be occupied by one or more users 102. The environment 100 may take the form of an indoor space such as one or more rooms of a home, office or other building; an outdoor space such as a garden or park; a partially covered space such as a gazebo; or a combination of such spaces such as a campus or stadium or other public place that has both indoor and outdoor spaces.

The environment 100 is equipped with a plurality of illumination sources 104 installed or otherwise disposed at different locations throughout the environment 100. An illumination source 104 may refer to any kind of illumination device for illuminating an environment or part of the environment occupied by a user 102, whether providing for example ambient lighting or specific task lighting. Each of the illumination sources 104 may take any of a variety of possible forms, such as a ceiling or wall mounted luminaire, a free-standing floor or table illumination source, or a less traditional form such as an illumination source embedded in a surface or an item of furniture. The different illumination sources 104 in the environment 100 need not take the same form as one another. Whatever form it takes, each illumination source 104 comprises at least one lamp (illumination element) and any associated housing, socket and/or support. Examples of suitable lamps include LED-based lamps, or traditional filament bulbs or gas discharge lamps.

In some scenarios the environment 100 may be divided into a plurality of different zones or localities, such as different rooms, each illuminated by a different respective subset of one or more of the illumination sources 104. For example, a zone may correspond to e.g. a living room, kitchen, hall, and bathroom, multiple bedrooms in a home; or multiple offices, hallways, a reception and a canteen or breakroom in an office building.

The environment 100 is also equipped with a plurality of control apparatus 106 disposed at one or more locations throughout the environment 100. For example, each zone or locality may comprise a single respective control apparatus 106. Alternatively, each zone or locality may comprise more than one respective control apparatus 106.

Figure 2:
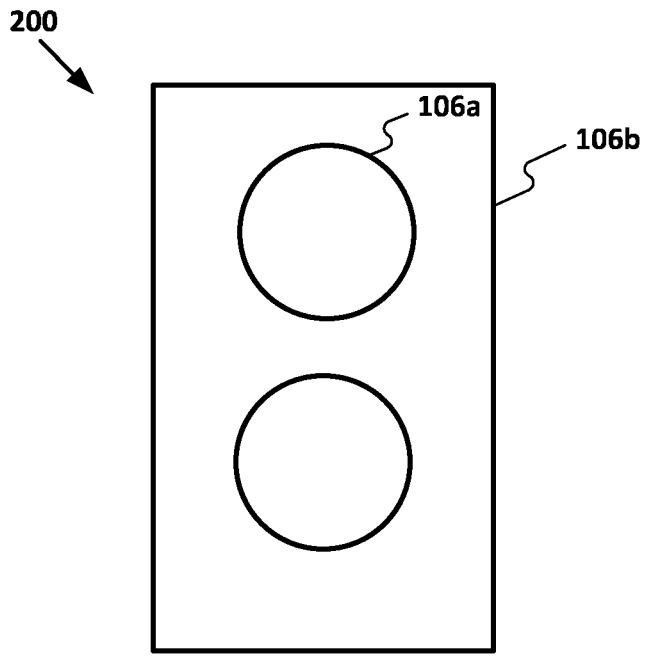
FIG. 2 shows schematically an example of a first control apparatus and a second control apparatus.

FIG. 2 illustrates an example configuration 200 of a first control apparatus 106a and a second control apparatus 106b.

Each of the control apparatus 106 (e.g. the first control apparatus 106a and the second control apparatus 106b) may take the form of a stand-alone control apparatus 106 such as a smart light switch, or alternatively a control apparatus 106 integrated in another user device such as a mobile user terminal such as a smartphone or tablet, or even a wearable device that can be worn about the user's person. A user terminal may be installed with for example a suitable lighting control "app". The control apparatus 106 may be mains powered and/or battery powered and/or use energy-harvesting techniques to supply its energy. The control apparatus 106 is configured to be able to control the illumination emitted by one or more illumination sources 104 in the environment 100. This may include switching the illumination sources 104 on/off, controlling the colour of the illumination, controlling the brightness or dimming level, controlling a time-varying effect of the illumination, etc.

The first control apparatus 106a may comprise an actuator device such as a button, switch, dial or slider device comprising one or more buttons, switches, dials and/or sliders etc.

The second control apparatus 106b may also comprise such a device. In another example, the second control apparatus 106b may be a dedicated station such as a mounting station or mounting plate (e.g. a wall plate) for supporting the first control device. Alternatively, the second control apparatus 106b may be integrated into a static central lighting control device or alternatively it may be integrated into an illumination source 104 such as a free-standing floor or table illumination source, or a less traditional form such as an illumination source embedded in a surface or item of furniture.

The second control apparatus 106b may comprise one or more mounting slots suitable for mounting one or more control apparatus 106 (e.g. the first control apparatus 106a).

Figure 3:
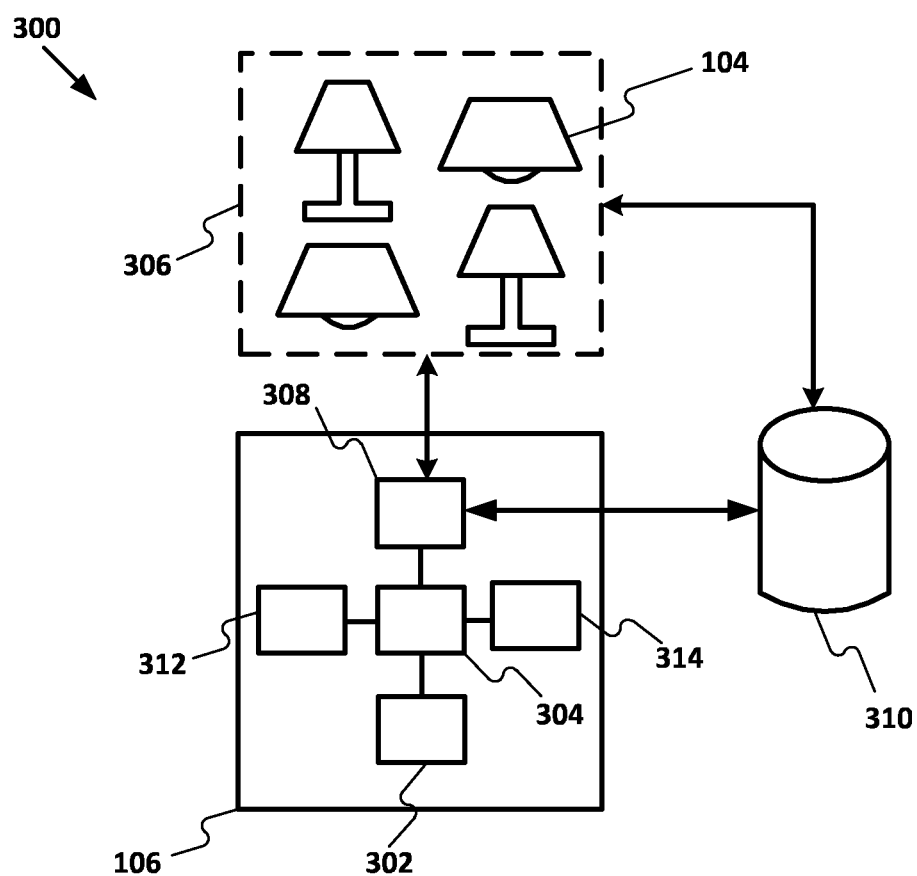
FIG. 3 shows schematically a block diagram of an example of a control system for controlling a lighting system.

FIG. 3 illustrates an example of a control system 300 enabling the user 102 to control the lighting from one or more of the illumination sources 104 based on a function assigned to the control apparatus 106. This may be to control the lighting in the same part of the environment as that in which the user inputs a command to the control apparatus 106 (e.g. in a downstairs room), or a different part (e.g. in an upstairs room).

The control apparatus 106 comprises a user interface 302 arranged to receive an input from the user and operatively coupled to a controller 304. The user interface 302 may comprise a display in the form of a screen and some arrangement for receiving inputs from the user. For example, the user interface 302 may comprise a touch screen, or a point-and-click user interface comprising a mouse, track pad, or tracker ball or the like. Alternatively or additionally, the user interface 302 may comprise a dedicated actuator or control panel for controlling the illumination sources 104 within the environment. For example, the control apparatus 106 may be in the form of a dedicated control unit (wired or wireless) which can be operated by the user, e.g. by using one or more buttons, sliders, switches and/or dials of the dedicated control panel.

The controller 304 of the control apparatus 106 is also coupled to a lighting system 306 comprising the illumination sources 104 discussed in relation to FIG. 1 via a wireless transceiver 308. The controller 304 can thereby control the lighting system 306 based on the identified commands in order to adjust one or more aspects of the illumination emitted by the illumination sources 104, e.g. to turn one or more of the illumination sources 104 on or off, to dim the illumination level up or down, to adjust the colour of the emitted illumination, to set a dynamic effect (e.g. varying in space and/or time), or to adjust any other aspects of the illumination that may be applicable to the illumination sources 104 within the environment. In some examples, the controller 304 can also control the actuators of non-illumination sources within the environment, e.g. window blinds, television set, music system, alarm system, etc.

In embodiments the controller 304 is implemented in the form of software stored in memory and arranged for execution on a processor (the memory on which the software is stored comprising one or more memory units employing one or more storage media, e.g. EEPROM (electrically erasable programmable read-only memory) or a magnetic drive, and the processor on which the software is run comprising one or more processing units). Alternatively, some or all of the controller 304 could be implemented in dedicated hardware circuitry, or configurable or reconfigurable hardware circuitry such as an ASIC (application-specific integrated circuit) or a PGA (programmable gain amplifier) or FPGA (field-programmable gate array). Whatever form it takes, in embodiments the controller 304 may be implemented internally in a single control apparatus 106 along with the user interface 302 and the wireless transceiver 308, i.e. in the same housing. Alternatively the controller 304 could, partially or wholly, be implemented externally such as on a lighting bridge or a server 310 comprising one or more server units at one or more geographic sites. Alternatively, the controller 304 may be partially or wholly implemented across one or more control apparatus 106. Where required, suitable remote communication and/or distributed processing techniques will, in themselves, be familiar to a person skilled in the art.

The controller 304 is configured to perform the actions of the control apparatus 106 described below and elsewhere herein. For example, the controller 304 is configured to receive the user commands via the user interface 302. The controller 304 is also configured to communicate with the one or more illumination sources 104 within the environment via the wireless transceiver 308 as detailed below. The controller 304 is also configured to communicate with the central bridge or server 310 via the wireless transceiver 308 as detailed below. The controller 304 is also configured to transmit and receive the signals to/from a transmitter 312 and a sensor 314 as detailed below.

The control apparatus 106 comprises the wireless transceiver 308 for communicating via any suitable wireless medium, e.g. a radio transceiver for communicating via a radio channel (though other forms are not excluded, e.g. an ultrasound or infrared transceiver). The wireless transceiver 308 may comprise for example a ZigBee, Bluetooth, Wi-Fi, Thread, JupiterMesh, Wi-SUN, 6LoWPAN, etc. interface for communicating with the illumination sources 104 and with the central bridge or server 310. Each illumination source 104 is configured to be able to communicate over a wireless channel based on a medium other than visible light, preferably a radio channel (though the possibility of other media such as ultrasound or infrared are not excluded). For instance the radio channel may be based on the same radio access technology used by the wireless transceiver 308 (e.g. ZigBee, Bluetooth, Wi-Fi, Thread, JupiterMesh, Wi-SUN, 6LoWPAN, etc). The radio channel can be used by the control apparatus 106 to control the lighting devices 104.

Alternatively, the wireless transceiver 308 may communicate with the illumination sources 104 via a central bridge or a server 310, for example, over a local area network such as a WLAN or a wide area network, such as the internet. In the case of receiving commands direct from the control apparatus 106, the illumination sources 104 may each comprise a receiver or transceiver. Alternatively, the illumination sources 104 may each comprise a wired connection, e.g. to communicate with a central bridge 310. The illumination sources 104 may also receive commands via the central bridge or server 310 via a wireless connection.

In embodiments the functionality of the central bridge/server 310 is implemented in the form of software stored in memory and arranged for execution on a processor (the memory on which the software is stored comprising one or more memory units employing one or more storage media, e.g. EEPROM or a magnetic drive, and the processor on which the software is run comprising one or more processing units). Alternatively it is not excluded that some or all of the functionality of the central bridge/server 310 could be implemented in dedicated hardware circuitry, or configurable or reconfigurable hardware circuitry such as an ASIC or a PGA or FPGA. Also note again that the central bridge or server 310 may be implemented locally within the environment 100 or at a remote location, and may comprise one or more physical units at one or more geographic sites.

The first control apparatus 106a (and, in some examples, the second control apparatus 106b) further comprises a sensor 314 coupled to the controller 304. The sensor 314 may be used to detect a signal transmitted from a transmitter 312 of another control apparatus 106 (e.g. the second control apparatus 106b). For example, the transmitter 312 may be a radio frequency identification device (RFID) tag and the sensor 314 may be an RFID reader. In one example, the transmitter 312 may be a near field communication (NFC) element and the sensor 314 may be an NFC reader. In another example, the transmitter 312 may be an optical identifier. For example, the optical identifier may be a barcode or a quick response (QR) code and the sensor 314 may be a barcode reader or a QR code reader such as a camera installed in the control apparatus 106.

In another example, the transmitter 312 may not be a non-NFC wireless signal. For example, the non-NFC wireless signal may be Bluetooth, Wi-Fi, etc. In this example, the control apparatus 106 (or the sensor 314) may be configured to detect a received signal strength. The physical body of the first and/or second control apparatus 106 may be designed such that a received signal strength threshold is reached only when the second and/or first control apparatus 106 is within a predetermined proximity. For example, the threshold may only be reached when the first control apparatus 106a is placed within a slot within the second control apparatus 106b.

In another example, the transmitter 312 and sensor 314 may be an infrared emitter and infrared detector respectively. Or in another example, the transmitter 312 and sensor 314 may be an ultrasound emitter and ultrasound detector respectively.

In yet another example, the transmitter 312 and sensor 314 may be a magnet (or reed relay) and a magnetic sensor respectively.

In another example, the transmitter 314 may be an electronic component in the first and/or second control apparatus 106 with one or more contacts which can be read by the second and/or first control apparatus 106 respectively, e.g. serial EEPROM or a resistor.

As a further example, the transmitter 314 may be a fingerprint or physical unclonable feature (PUF) located on the first and/or second control apparatus 106 whilst the sensor 312 may be a fingerprint scanner or equivalent installed on the second and/or first control apparatus respectively.

In another example, the second control apparatus 106b may be a charging pad and the charging signal produced by the transmitter 314 of the charging pad may include a modulation such that the first control apparatus 106a may detect on which charging pad (i.e. control apparatus 106) it is placed. The charging pad may also charge the battery of the control apparatus 106.

The first and or second control apparatus 106 may further comprise a mounting arrangement (not shown) for physically mounting the control apparatus 106. The mounting arrangement may be for example a mechanical mounting mechanism. Alternatively or additionally, the mounting arrangement may be magnetic. In one possible embodiment the magnetic mounting arrangement may utilise the same magnets used for the transmitter 314 and sensor 312 combination detailed above. In alternative examples, the control apparatus 106 does not comprise a mounting arrangement as such. For example, a control apparatus 106 may be placed (i.e. rested) on top of another control apparatus comprising a mounting station 106b (e.g. a charging pad).

In an example, mounting a control apparatus 106 means placing the control apparatus 106 in/on a mounting station 106b such that the mounting station 106b supports the control apparatus 106. For example, the mounting station 106b may be mounted on a wall and comprise a mounting mechanism in the form of a slot into which the control apparatus 106 may be placed. In another example the mounting station 106b may be a horizontal platform on which the control apparatus 106 may be placed.

As detailed above, one or more illumination sources 104 may be controlled in response to a command input to the first control apparatus 106a by the user 102. The illumination source(s) 104 are controlled based on a function assigned to the first control apparatus 106a, wherein the assigned function is based on the relative position of the first control apparatus 106a compared to a second control apparatus 106b.

In embodiments, determining the relative position may comprise determining whether or not the first control apparatus 106a and the second control apparatus 106b are co-located according to at least one predetermined criterion. In these embodiments, the function assigned to the first control apparatus 106a is based on whether the first control apparatus 106a and the second control apparatus 106b are determined to be co-located according to the predetermined criterion. If the first and second control apparatus 106a, 106b are co-located, the first control apparatus 106a is assigned a first function. Whereas if the first and second control apparatus 106a, 106b are not co-located, the first control apparatus 106a is assigned a second, different function.

In an example, the function of the second control apparatus 106b may be assigned based on the determined relative position of the first control apparatus 106a compared to the second control apparatus 106b. In another example, the assigned function of the second control apparatus 106b may also be based on whether or not the first control apparatus 106a and second control apparatus 106b are co-located according to at least on predetermined criterion.

In alternative embodiments, determining the relative position may not comprise determining whether or not the first and second control apparatus 106a, 106b are co-located according to a predetermined criterion. For example, determining the relative position may simply comprise determining if the first and second control apparatus 106a, 106b are located within the same room within the environment 100.

Additionally, in some embodiments, the first control apparatus 106a may not be assigned a first or second function based on whether the first and second control apparatus 106a, 106b are co-located. For example, the first control apparatus 106a may be assigned the same function regardless of whether it is co-located with a second control apparatus 106b.

In embodiments, the first control apparatus 106a comprises a first control actuator for receiving a first user input to control one or more illumination sources 104 and the second control apparatus 106b comprises a second control actuator for receiving a second user input to control one or more illumination sources 104. For example, the first and second control apparatus 106a, 106b may be a smart switch, a smart button, etc.

In an example, the illumination sources 104 controlled by the first and second user inputs may be the same illumination sources 104 or different illumination sources 104, i.e. exclusive of one another. For example, the first user input may control a first subset of illumination sources 104 and the second input may control a second subset of illumination sources 104. In examples, the first and second subsets may partially or wholly overlap, or one subset may be wholly contained within the other subset.

In alternative embodiments, the first control apparatus 106a may comprise a first control actuator whilst the second control apparatus 106b may not comprise a control actuator. For example, the second control apparatus 106b may be a mounting station suitable for mounting at least the first control apparatus 106a.

In embodiments, the predetermined criteria for the first and second control apparatus 106a, 106b to be co-located may be whether or not the first control apparatus 106a is placed on top of the second control apparatus 106b. In these embodiments, the function of the first control apparatus 106a is based on whether the first control apparatus 106a is placed on top of the second control apparatus 106b.

For example, being placed on top of the second control apparatus 106b may refer to the first control apparatus 106a being physically placed on top of the second control apparatus 106b. The first and/or second control apparatus 106a, 106b may comprise a physical mechanism to ensure the two control apparatus 106 are physically attached.

Alternatively, the first and second control apparatus 106a, 106b may be physically touching but not attached to each other (e.g. the user holds the two control apparatus together).

In an example, if the first control apparatus 106a is placed on top of the second control apparatus 106b, the first control apparatus 106a may be used to increase a lighting parameter (e.g. brightness, hue, saturation, colour temperature) of one or more illumination sources 104 whilst the second control apparatus 106b may be used to decrease that lighting parameter of the same (or different) illumination source(s) 104. In another example, the assigned function may be to cycle back and forth through a list of predefined items (e.g. lighting scenes or lighting recipes). In another example, the assigned function may be to enhance or reduce the total impact of an effect (e.g. brightness, speed). For example, the speed of a dynamic lighting scene may be increased or decreased. In yet another example, the assigned function may be to cycle through the various stages of circadian lighting.

In examples, the first control apparatus 106a may be assigned a first function if it is placed on top of the second control apparatus 106b and a second, different function if it is not placed on top of the second control apparatus 106b. In alternative examples, the first control apparatus 106a may be assigned the same function regardless of whether or not it is placed on top of the second control apparatus 106b. In further alternative examples, placing the first control apparatus 106a on top of the second control apparatus 106b may not affect the function of the first control apparatus 106a.

In alternative embodiments, the predetermined criterion for the first and second control apparatus 106a, 106b to be co-located may be whether or not the first control apparatus 106a is positioned on the same plane as the second control apparatus 106b. In these embodiments, the function of the first control apparatus 106a is based on whether the first control apparatus 106a is positioned on the same plane as the second control apparatus 106b.

For example, the first and second control apparatus may be placed on a horizontal plane, such as the surface of a table or desk. In another example, the first and second control apparatus may be placed on a vertical plane such as a wall or a wall plate (e.g. a mounting station).

In examples, the first control apparatus 106a may be assigned a first function if it is positioned on the same plane as the second control apparatus 106b and a second, different function if it is not positioned on the same plane as the second control apparatus 106b. In alternative examples, the first control apparatus 106a may be assigned the same function regardless of whether or not it is positioned on the same plane as the second control apparatus 106b. In further alternative examples, positioning the first control apparatus 106a on the same plane as the second control apparatus 106b may not affect the function of the first control apparatus 106a.

In alternative embodiments, the predetermined criterion for the first and second control apparatus 106a, 106b to be co-located may be whether or not the first control apparatus 106a and the second control apparatus 106b are both mounted at the same mounting station (the mounting station being suitable for mounting the first and second control apparatus). In these embodiments, the function of the first control apparatus 106a is based on whether the first control apparatus 106a and the second control apparatus 106b are both mounted at the same mounting station.

For example, the mounting station may be located on a vertical surface (e.g. a wall plate), on a horizontal surface (e.g. on a desk, table) or embedded within a piece of furniture, illumination source 104 or alternative device (e.g. a charging station or pad).

In some examples, being mounted at a mounting station may require the first and second control apparatus 106a, 106b to be placed on the mounting station. In other example, the first and second control apparatus 106a, 106b may be inserted into respective slots of the mounting station. In another example, mounting may mean physically attaching the first and second control apparatus 106a, 106b to the mounting station (e.g. magnetically or mechanically).

In examples, the first control apparatus 106a may be assigned a first function if it is mounted at the same mounting station as the second control apparatus 106b and a second, different function if it is not mounted at the same mounting station as the second control apparatus 106b. In alternative examples, the first control apparatus 106a may be assigned the same function regardless of whether or not it is mounted at the same mounting station as the second control apparatus 106b. In further alternative examples, mounting the first control apparatus 106a at the same mounting station as the second control apparatus 106b may not affect the function of the first control apparatus 106a.

In alternative embodiments, the predetermined criterion for the first and second control apparatus 106a, 106b to be co-located may be whether or not the first control apparatus 106a and the second control apparatus 106b are within a predetermined proximity or distance of each other. In these embodiments, the function of the first control apparatus 106a is based on whether the first control apparatus 106a and the second control apparatus 106b are within said predetermined proximity of each other.

In an example, the predetermined proximity may be a radius between a point on the first control apparatus 106a and a point on the second control apparatus 106b. For example, the two points may be the centres of the first and second control apparatus 106a, 106b. In this example, the centre of the second control apparatus 106b must be within a predetermined radius of the centre of the first control apparatus 106a.

In another example, the two points may be located on the upper and lower surfaces of the first and second control apparatus 106a, 106b respectively. In this example, the lower surface of the second control apparatus 106b must be located within a predetermined distance of the upper surface of the first control apparatus 106a. It will be appreciated that the two points may in fact correspond to the lower and upper surfaces of the first and second control apparatus 106a, 106b respectively. Additionally, the two points may correspond to the upper surface of both the first and second control apparatus 106a, 106b or to the lower surface of both the first and second control apparatus 106a, 106b.

In another example, the predetermined proximity may be a predetermined distance from the outer edge, circumference or surface of the first control apparatus 106a, whereby, in order to be co-located, the second control apparatus 106b may be partially or wholly within the predetermined distance.

In examples, the first control apparatus 106a may be assigned a first function if the first control apparatus 106a and the second control apparatus 106b are within a predetermined proximity of each other and a second, different function if the first control apparatus 106a and the second control apparatus 106b are not within a predetermined proximity of each other. In alternative examples, the first control apparatus 106a may be assigned the same function regardless of whether or not the first control apparatus 106a and the second control apparatus 106b are within a predetermined proximity of each other. In further alternative examples, the first control apparatus 106a and the second control apparatus 106b being within a predetermined proximity of each other may not affect the function of the first control apparatus 106a.

In embodiments, the first and second control apparatus 106a, 106b may have to satisfy at least one predetermined criterion to be co-located. In alternative embodiments, the first and second control apparatus 106a, 106b may not have to satisfy any predetermined criteria to be regarded as co-located. In embodiments, the first and second control apparatus 106a, 106b may have to satisfy more than one predetermined criterion to be regarded as co-located.

For example, to be co-located, the first control apparatus 106a may be placed on top of the second control apparatus 106b within a predetermined proximity of the second control apparatus 106b. In some examples, the predetermined proximity may be such that the first and second control apparatus 106a, 106b must be physically touching. In alternative examples, the first and second control apparatus 106a, 106b may not have to be touching.

In another example, to be co-located, the first control apparatus 106a may be positioned on the same plane as the second control apparatus 106b within a predetermined proximity. In some examples, the predetermined proximity may be such that the first and second control apparatus 106a, 106b must be physically touching. In alternative examples, the first and second control apparatus 106a, 106b may not have to be touching.

In yet another example, to be co-located, the first and second control apparatus 106a, 106b may be mounted at the same mounting station within a predetermined proximity. For example, the mounting station may be large enough such that it can support a multitude of control apparatus 106. In this example, to be co-located the first and second control apparatus 106a, 106b may have to be in neighbouring slots or positions.

In embodiments, determining the relative position of the first and second control apparatus 106a, 106b comprises determining a relative orientation of the first and second control apparatus 106a, 106b when they are both mounted at a mounting station. In these embodiments, the function of the first control apparatus 106a is also assigned based on the determined relative orientation of the first and second control apparatus 106a, 106b when mounted at the mounting station.

For example, the mounting station may be a wall plate or the like with two or more slots, inserts, etc. each suitable for mounting a control apparatus 106. The slot in which each control apparatus 106 is placed may affect the assigned functionality of the first and/or second control apparatus 106a, 106b. In an example, the mounting station has two slots (e.g. an upper and lower slot or a left and right slot). Therefore two relative orientations are possible for each slot design: the first control apparatus 106a can be above or below the second control apparatus 106b, or the first control apparatus 106a can be to the left or right of the second control apparatus 106b. If the first control apparatus 106a is above the second control apparatus 106b, it may be assigned a first function. If the first control apparatus 106a is below the second control apparatus 106b, it may be assigned a second, different function or a complementary function. It will be appreciated that orientating the first control apparatus 106a to the left or right of the second control apparatus 106b may produce similar results.

In another example, the mounting station may have three slots. In this example, there are six possible relative orientations. This is true if there are only two control apparatus (the first and second control apparatus 106a, 106b) and also if there is a third control apparatus. For example, if there are only two control apparatus 106, the empty slot may also contribute to the relative orientation of the first and second control apparatus 106a, 106b and the corresponding assignment of functions to the control apparatus 106a, 106b.

In yet another example, the mounting station may have four or more slots suitable for mounting a control apparatus 106 (e.g. a diamond or cross-shaped configuration). In an example, the slots may form a circular pattern. For example, the control apparatus 106 mounted at the top of the circle (e.g. corresponding to north on a compass) may trigger a set of illumination sources 104 to emit with the first stage of circadian lighting.

In alternative embodiments, the relative orientation of the first and second control apparatus 106a, 106b may not affect the function assigned to the first control apparatus 106a. For example, the function of the first control apparatus 106a when orientated above the second control apparatus 106b may be the same as when the first control apparatus 106a is orientated below the second control apparatus 106b.

In embodiments, the first control apparatus 106a may comprise a first control actuator for receiving the first user input and the second control apparatus 106b may comprise a mounting station suitable for mounting one or more of said plurality of control apparatus 106. In these embodiments, the predetermined criterion for the first and second control apparatus 106a, 106b to be co-located may be whether or not the first control apparatus 106a is mounted at the second control apparatus. In these embodiments, the function of the first control apparatus 106a is based on whether the first control apparatus 106a is mounted at second control apparatus 106b.

For example, as discussed above the second control apparatus 106b may be a dedicated station such as a mounting station or mounting plate (e.g. a wall plate) for supporting the first control device. Alternatively, the second control apparatus 106b may be integrated into a static central lighting control device or alternatively it may be integrated into an illumination source 104 such as a free-standing floor or table illumination source, or a less traditional form such as an illumination source embedded in a surface or item of furniture.

In examples, the first control apparatus 106a may be assigned a first function if the first control apparatus 106a is mounted at the second control apparatus 106b and a second, different function if the first control apparatus 106a is not mounted at the second control apparatus 106b. In alternative examples, the first control apparatus 106a may be assigned the same function regardless of whether or not the first control apparatus 106a is mounted at the second control apparatus 106b. In further alternative examples, the first control apparatus 106a being mounted at the second control apparatus 106b may not affect the function of the first control apparatus 106a.

In embodiments, the first function assigned to the first control apparatus 106a may only comprise an ability to set one or more illumination sources 104 to an on state or only an ability to set the one or more illumination sources 104 to an off state, and the second function assigned to the first control apparatus 106a may comprise toggling one or more illumination sources 104 between on and off states.

For example, when the first control apparatus 106a and second control apparatus 106b are co-located according to at least one of the predetermined criteria discussed above, the first control apparatus 106a may either switch a set of illumination sources 104 to an on state or to an off state, but not both. That is, the first control apparatus 106a is either only an on switch or only an off switch. In an example, the first and second control apparatus 106a, 106b may be held together by the user 102 such that using the first control apparatus 106a (e.g. pressing a button on it) switches the illumination sources 104 on and using the second control apparatus 106b switches the illumination sources 104 off.

Similarly, if the first and second control apparatus 106a, 106b are mounted at a mounting station (e.g. one above the other) the first control apparatus 106a may be used to switch a group of illumination sources 104 on, whilst the second control apparatus 106b may be used to switch the group of illumination sources 104 off.

In examples, when the first control apparatus 106a and second control apparatus 106b are co-located according to at least one of the predetermined criteria detailed above, the first control apparatus 106a may be used to toggle between an on and off state. That is, the user 102 may operate the same control apparatus to switch a set of illumination sources 104 on or off. For example, if the illumination sources 104 within a room are off, the user 102 may provide a user input to switch the illumination sources 104 within the room to an on state. Subsequently providing a second user input may switch the illumination sources 104 within the room back to the off state.

In embodiments, the second function assigned to the first control apparatus 106a may comprise toggling one or more illumination sources 104 between an on and off state. For example, when the first control apparatus 106a is not co-located with a second control apparatus 106b, the first control apparatus 106a may always be used to toggle the one or more illumination sources 104 between an on and off state.

In alternative embodiments, the second function assigned to the first control apparatus 106a may comprise toggling one or more illumination sources 104 between an on and off state. For example, the second function may control one or more illumination sources 104 (e.g. all of the lights within a room) to emit a predefined lighting scene. In another example, the second function may control one or more illumination sources 104 (e.g. one or more table lamps) to emit with cool, white light.

In embodiments, the first function assigned to the first control apparatus 106a may comprise cycling though a list of predefined lighting settings. For example, the first control apparatus 106a may cycle to the next lighting setting within the list whilst the second control apparatus may cycle to the previous lighting setting within the list. In an example, lighting setting may comprise a predefined brightness, hue, saturation, colour and/or temperature of one or more illumination sources 104. In another example, a lighting setting may comprise a lighting scene or recipe.

In additional or alternative embodiments, the first function assigned to the first control apparatus 106a may comprise varying the colour of the illumination emitted by one or more illumination sources 104. For example, the first control apparatus 106a may be used to cycle through illumination of different colours in one direction, whilst the second control apparatus 106b may be used to cycle though illumination of different colours in the opposite direction. E.g. cycling through colours of the rainbow.

In another example, varying the colour of the illumination emitted by one or more illumination sources 104 may comprise increasing or decreasing the colour temperature of the illumination. For example, the first control apparatus 106a may be used to increase the colour temperature of the emitted illumination (e.g. from 3000K warm white to 4000K cool white). In this example, the second control apparatus 106b may be used to decrease the colour temperature of the emitted illumination.

In additional or alternative embodiments, the first function assigned to the first control apparatus 106a may comprise varying a dim level of the illumination emitted by one or more illumination sources 104 by intermediate degrees between on and off.

For example, when the first and second control apparatus 106a, 106b are co-located, the first control apparatus 106a may be used to increase the dim level of the illumination emitted by the one or more illumination sources 104 whilst the second control apparatus 106b may be used to decrease the dim level. In alternative embodiments, the first control apparatus 106a may decrease the dim level whilst the second control apparatus 106b may increase the dim level.

In some examples, the assigned function of the first control apparatus 106a is programmable by the user 102. For example, the function of the first control apparatus 106a may be programmable to vary depending on the determined relative position of the first and second control apparatus 106a, 106b. In another example, the assigned first function and the assigned second function may be programmable to vary depending on whether or not the first and second control apparatus 106a, 106b are co-located. In yet another example, the assigned first function and the assigned second function may be programmable to vary depending on the relative orientation of the first and second control apparatus 106a, 106b.

In an example, the assigned function may be programmable directly into the first control apparatus 106a, e.g. via the user interface 302. In another example, the assigned function may be programmable via the central bridge 210. In another example, the user may use a device such as a mobile device (e.g. a smartphone or tablet) to program the assigned function of the first control apparatus 106a.

In alternative embodiments, the assigned function of the first control apparatus 106a may not be programmable by the user 102. For example, the assigned functions may be set by the manufacturer and may not be configurable.

The methods by which the relative position of the first control apparatus 106a in relation to the second control apparatus 106b will now be discussed.

In embodiments, determining the relative position of the first control apparatus 106a compared to the second control apparatus 106b may comprise detecting, by the first and/or second control apparatus 106a, 106b, a received signal strength emitted from the second and/or first control apparatus 106b, 106a respectively.

For example, the transmitter 312 of the first and/or second control apparatus 106a, 106b may transmit a wireless signal to be received by the sensor 314 of the second and/or first control apparatus 106b, 106a respectively. In an example, the received signal strength of the signal, when detected by the sensor 314 of the first and/or second control apparatus 106a, 106b, may be used to determine a relative positon of the first control apparatus 106a.

In an example, if the received signal strength of the signal detected by the sensor 314 is greater than a predetermined threshold, the first and second control apparatus 106a, 106b may be determined as being co-located. If the received signal strength of the signal detected by the sensor 314 is less than a predetermined threshold, the first and second control apparatus 106a, 106b may be determined as not being co-located.

In another example, determining the relative position of the first control apparatus 106a compared to the second control apparatus 106b may comprise detecting the time of flight for transmission and receipt of a signal emitted by the first and/or second control apparatus 106a, 106b and reflected by the second and/or first control apparatus 106b, 106a respectively.

For example, if the time of flight of the signal detected by the sensor is less than a predetermined time period, the first and second control apparatus may be determined as being co-located. If the time of flight of the signal detected by the sensor is greater than a predetermined time period, the first and second control apparatus may be determined as not being co-located.

In another example, if the wireless signal transmitted by the first and/or second control apparatus is not detected by second and/or first control apparatus respectively, the first control apparatus may be determined as being in a stand-alone mode (e.g. not co-located).

In embodiment, determining the relative position of the first control apparatus 106a compared to the second control apparatus 106b may comprise detecting, by the first and/or second control apparatus 106a, 106b, an infrared signal emitted from the second and/or first control apparatus 106b, 106a respectively.

In embodiments, determining the relative position of the first control apparatus 106a compared to the second control apparatus 106b may comprise detecting, by the first and/or second control apparatus 106a, 106b, a magnetic field emitted from the second and/or first control apparatus 106b, 106a respectively.

For example, the transmitter 312 of the first and/or second control apparatus 106a, 106b may be a magnetic emitter and the sensor 314 of the second and/or first control apparatus 106b, 106a respectively may be a magnetic sensor. In an example, the strength of the magnetic field emitted by the magnetic emitter, when detected by the sensor 314 of the first and/or second control apparatus 106a, 106b, may be used to determine a relative positon of the first control apparatus 106a.

In an example, simply detecting the presence of the magnetic emitter by the magnetic sensor is enough to determine the relative positon of the first control apparatus 106a.

In examples, the methods discussed above may be used to determine whether or not the first and second control apparatus 106a, 106b are co-located. For example, the strength of the magnetic field detected may determine whether the first control apparatus 106a is mounted at a second control apparatus 106b.

In embodiments, determining the relative position of the first control apparatus 106a compared to the second control apparatus 106b may comprise detecting, by the first and/or second control apparatus, a near field communication (NFC) element of the second and/or first control apparatus respectively 106b, 106a.

For example, the transmitter 312 of the first and/or second control apparatus 106a, 106b may be an NFC element (i.e. transmitter) to be received by the sensor 314 (i.e. NFC detector) of the second and/or first control apparatus 106b, 106a respectively. In an example, the NFC element, when detected by the sensor 314 of the first and/or second control apparatus 106a, 106b may be used to determine a relative positon of the first control apparatus 106a.

In an example, determining whether or not the first and second control apparatus 106a, 106b are co-located may comprise detecting, by the first and/or second control apparatus 106a, 106b, an NFC element of the second and/or first control apparatus 106b, and 106a respectively. For example, when the user 102 places the first and second control apparatus 106a, 106b together (e.g. one on top of the other), one or both of the control apparatus 106 may detect an NFC element of the other control apparatus 106.

In embodiments, determining the relative position of the first control apparatus 106a compared to the second control apparatus 106b may comprise detecting, by the first and/or second control apparatus 106a, 106b, a mechanical connection with the second and/or first control apparatus 106b, 106a respectively. For example, the mechanical connection may be a plug and socket type connection. In examples, the first and/or second control apparatus 106a, 106b may detect when the mechanical connection has been engaged in order to determine the relative position of the first control apparatus 106a.

In embodiments, determining the relative position of the first control apparatus 106a compared to the second control apparatus 106b may comprise detecting, by the first and/or second control apparatus 106a, 106b, a physical contact with the second and/or first control apparatus 106b, 106a respectively. For example, relative position of the first control apparatus 106a may be determined by detecting if the first control apparatus 106a is physically touching the second control apparatus 106b.

In embodiments, determining the relative position of the first control apparatus 106a compared to the second control apparatus 106b may comprise a combination of two or more of the methods detailed above.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of controlling a lighting system comprising a plurality of illumination sources each controllable to emit respective illumination for illuminating the environment and a plurality of control apparatus, each comprising a smart button or a smart switch, for use in controlling the illumination emitted from one or more of said plurality of illumination sources, the method comprising:
   determining the relative position of a first control apparatus compared to a second control apparatus; and
   assigning a function to the first control apparatus, the function defining how the first control apparatus is to control the illumination of one or more of said illumination sources, wherein the function of the first control apparatus is assigned based on the determined relative position of the first control apparatus compared to the second control apparatus,
   whereby a first user input can be received at the first control apparatus and the illumination of said one or more illumination sources can be controlled in response to the first user input based on the assigned function of the first control apparatus,
   wherein said determining of the relative position comprises determining whether or not the first control apparatus and the second control apparatus are co-located according to at least one predetermined criterion;
   wherein said assigning of the function of the first control apparatus is based on whether the first control apparatus and the second control apparatus are determined to be co-located according to said at least one predetermined criterion, such that:
      the first control apparatus being assigned a first function if the first control apparatus and the second control apparatus are co-located, and
      the first control apparatus being assigned a second function, different from the first function, if the first control apparatus and the second control apparatus are not co-located,
   wherein said at least one predetermined criterion comprises:
   whether the first control apparatus is placed on top of the second control apparatus, wherein said function of the first control apparatus is based on whether the first control apparatus is placed on top of the second control apparatus.

2. A method of controlling a lighting system comprising a plurality of illumination sources each controllable to emit respective illumination for illuminating the environment and a plurality of control apparatus, each comprising a smart button or a smart switch, for use in controlling the illumination emitted from one or more of said plurality of illumination sources, the method comprising:
   determining the relative position of a first control apparatus compared to a second control apparatus; and
   assigning a function to the first control apparatus, the function defining how the first control apparatus is to control the illumination of one or more of said illumination sources, wherein the function of the first control apparatus is assigned based on the determined relative position of the first control apparatus compared to the second control apparatus,
   whereby a first user input can be received at the first control apparatus and the illumination of said one or more illumination sources can be controlled in response to the first user input based on the assigned function of the first control apparatus,
   wherein said determining of the relative position comprises determining whether or not the first control apparatus and the second control apparatus are co-located according to at least one predetermined criterion;
   wherein said assigning of the function of the first control apparatus is based on whether the first control apparatus and the second control apparatus are determined to be co-located according to said at least one predetermined criterion, such that:
      the first control apparatus being assigned a first function if the first control apparatus and the second control apparatus are co-located, and
      the first control apparatus being assigned a second function, different from the first function, if the first control apparatus and the second control apparatus are not co-located,
   wherein said at least one predetermined criterion comprises:
   whether the first control apparatus is positioned on a same plane as the second control apparatus, wherein said function of the first control apparatus is based on whether the first control apparatus is positioned on the same plane as the second control apparatus.

3. The method according to claim 2, wherein said at least one predetermined criterion comprises:
   whether the first control apparatus and the second control apparatus are within a predetermined proximity of each other, wherein said function of the first control apparatus is based on whether the first control apparatus and the second control apparatus are within said predetermined proximity of each other.

4. The method according to claim 2, wherein the second function comprises toggling said one or more illumination sources between an on and off state.

5. The method according to claim 2, wherein the first function comprises at least one of:
   cycling though a list of predefined lighting settings;
   varying the colour of the illumination emitted by said one or more illumination sources;
   varying the colour temperature of the illumination emitted by said one or more illumination sources; or
   varying a dim level of the illumination emitted by said one or more illumination sources by intermediate degrees between on and off.

6. The method according to claim 2, wherein the assigned function of the first control apparatus is programmable by a user.

7. A non-transitory storage medium comprising a program of instructions, wherein said instructions cause at least one processor to perform the method according claim 2 the at least one processor executes said instructions.

8. The method according to claim 2, wherein the second control apparatus is configured to wirelessly control the illumination of the one or more of said illumination sources.

9. A method of controlling a lighting system comprising a plurality of illumination sources each controllable to emit respective illumination for illuminating the environment and a plurality of control apparatus, each comprising a smart button or a smart switch, for use in controlling the illumination emitted from one or more of said plurality of illumination sources, the method comprising:
  determining the relative position of a first control apparatus compared to a second control apparatus; and
  assigning a function to the first control apparatus, the function defining how the first control apparatus is to control the illumination of one or more of said illumination sources, wherein the function of the first control apparatus is assigned based on the determined relative position of the first control apparatus compared to the second control apparatus,
  whereby a first user input can be received at the first control apparatus and the illumination of said one or more illumination sources can be controlled in response to the first user input based on the assigned function of the first control apparatus,
  wherein said determining of the relative position comprises determining whether or not the first control apparatus and the second control apparatus are co-located according to at least one predetermined criterion;
  wherein said assigning of the function of the first control apparatus is based on whether the first control apparatus and the second control apparatus are determined to be co-located according to said at least one predetermined criterion, such that:
    the first control apparatus being assigned a first function if the first control apparatus and the second control apparatus are co-located, and
    the first control apparatus being assigned a second function, different from the first function, if the first control apparatus and the second control apparatus are not co-located,
  wherein said at least one predetermined criterion comprises:
    whether the first control apparatus and the second control apparatus are both mounted at a same mounting station suitable for mounting the first and second control apparatus, wherein said function of the first control apparatus is based on whether the first control apparatus and the second control apparatus are both mounted at the same mounting station.

10. A method of controlling a lighting system comprising a plurality of illumination sources each controllable to emit respective illumination for illuminating the environment and a plurality of control apparatus, each comprising a smart button or a smart switch, for use in controlling the illumination emitted from one or more of said plurality of illumination sources, the method comprising:
  determining the relative position of a first control apparatus compared to a second control apparatus; and
  assigning a function to the first control apparatus, the function defining how the first control apparatus is to control the illumination of one or more of said illumination sources, wherein the function of the first control apparatus is assigned based on the determined relative position of the first control apparatus compared to the second control apparatus and wherein the second control apparatus is distinct from the one or more of said illumination sources,
  whereby a first user input can be received at the first control apparatus and the illumination of said one or more illumination sources can be controlled in response to the first user input based on the assigned function of the first control apparatus,
  wherein said determining of the relative position comprises determining whether or not the first control apparatus and the second control apparatus are co-located according to at least one predetermined criterion;
  wherein said assigning of the function of the first control apparatus is based on whether the first control apparatus and the second control apparatus are determined to be co-located according to said at least one predetermined criterion, such that:
    the first control apparatus being assigned a first function if the first control apparatus and the second control apparatus are co-located, and
    the first control apparatus being assigned a second function, different from the first function, if the first control apparatus and the second control apparatus are not co-located,
  wherein the second function comprises toggling said one or more illumination source(s) between an on and off state, and the first function comprises only an ability to set said one or more illumination sources to an on state or only an ability to set said one or more illumination sources to an off state.

11. A method of controlling a lighting system comprising a plurality of illumination sources each controllable to emit respective illumination for illuminating the environment and a plurality of control apparatus, each comprising a smart button or a smart switch, for use in controlling the illumination emitted from one or more of said plurality of illumination sources, the method comprising:
  determining the relative position of a first control apparatus compared to a second control apparatus; and
  assigning a function to the first control apparatus, the function defining how the first control apparatus is to control the illumination of one or more of said illumination sources, wherein the function of the first control apparatus is assigned based on the determined relative position of the first control apparatus compared to the second control apparatus,
  whereby a first user input can be received at the first control apparatus and the illumination of said one or more illumination sources can be controlled in response to the first user input based on the assigned function of the first control apparatus,
  wherein said determining of the relative position comprises:
    determining a relative orientation of the first and second control apparatus, when both the first and second control apparatus are mounted at a mounting station,
  wherein said function of the first control apparatus is further assigned based on the determined relative orientation of the first and second control apparatus when mounted at the mounting station.

* * * * *